United States Patent [19]

Assous et al.

[11] Patent Number: 5,654,635

[45] Date of Patent: Aug. 5, 1997

[54] METHOD AND DEVICE FOR SIMULTANEOUS IDENTIFICATION AND CORRECTION OF ERRORS DUE TO MAGNETIC PERTURBATIONS AND TO MISALIGNMENTS IN THE MEASUREMENTS OF A MAGNETOMETER

[75] Inventors: Eric Charles Assous, Marseilles; Jean-Paul Petillon, Vitrolles, both of France

[73] Assignee: Eurocopter France, Marignane, France

[21] Appl. No.: 573,372

[22] Filed: Dec. 15, 1995

[30] Foreign Application Priority Data

Dec. 19, 1994 [FR] France .................. 94 15231

[51] Int. Cl.$^6$ ........................... G01R 33/02
[52] U.S. Cl. .................. 324/244; 324/245; 324/225; 364/559
[58] Field of Search .................... 324/244, 245, 324/246, 247, 225, 202; 364/454, 457, 570.01, 570.02, 559; 33/356-359

[56] References Cited

U.S. PATENT DOCUMENTS

| | | | |
|---|---|---|---|
| 4,611,293 | 9/1986 | Hatch et al. | 364/571 |
| 4,870,602 | 9/1989 | Baumker | 364/571.02 |
| 4,972,593 | 11/1990 | Dahlen et al. | 33/356 |
| 5,182,514 | 1/1993 | Rice, Jr. | 324/244 |

FOREIGN PATENT DOCUMENTS

| | | |
|---|---|---|
| 0226653A1 | 1/1987 | European Pat. Off. . |
| 2507770 | 12/1982 | France . |
| 2128749 | 2/1984 | United Kingdom . |

*Primary Examiner*—Sandra L. O'Shea
*Assistant Examiner*—J. M. Patidar
*Attorney, Agent, or Firm*—Marshall, O'Toole, Gerstein, Murray & Borun

[57] ABSTRACT

The present invention relates to a method and to a device (1) for correcting measurement errors of a magnetometer (2) mounted on a vehicle (3). According to the invention:

a theoretical corrective model $[A].Hm+a.Hm'+Hp=[M].H$ is defined, in which [A], a and H are elements to be determined, Hm is the measured field, Hm' the time derivative of Hm, H the effective field and [M] a transformation matrix;

a vector error $E=[M].H-([A].Hm+a.Hm'+Hp)$ is defined;

the square of the error thus defined is determined; and the coefficients of the model which minimize the sum of the squares of the errors for all the measurements taken are identified.

13 Claims, 3 Drawing Sheets

METHOD AND DEVICE FOR SIMULTANEOUS IDENTIFICATION AND CORRECTION OF ERRORS DUE TO MAGNETIC PERTURBATIONS AND TO MISALIGNMENTS IN THE MEASUREMENTS OF A MAGNETOMETER

BACKGROUND OF THE INVENTION

The present invention relates to a method for simultaneous identification and correction of errors due to magnetic perturbations and to misalignments in the measurements of a magnetometer mounted on board a vehicle, as well as to a device for implementing this method and to various systems using said device.

It is known that a magnetometer mounted on board a vehicle, in particular an aircraft, is generally subjected to magnetic perturbations and that it is not rigorously aligned relative to the reference coordinate system of the vehicle, which makes the magnetic field measurements taken by this magnetometer inaccurate.

Essentially four types of perturbation can be categorized: three types of magnetic perturbation, namely, more specifically:

so-called "soft iron" perturbations due to the presence in proximity to the magnetometer of ferromagnetic materials which, although magnetized, deflect the field lines;

so-called "hard iron" perturbations, due to the presence in proximity to the magnetometer of magnetized and/or electrically conductive materials through which direct currents flow; and magnetic fields which are generated by the eddy currents created by magnetic flu variations in the metal structures of the vehicle; and installation errors. It is known that the ideal positioning of the magnetometer corresponds to perfect alignment of the reference coordinate system of the magnetometer relative to that of the vehicle. However, because of manufacturing tolerances, this perfect alignment is never achieved, which causes perturbation of the vector measurements taken.

In order to obtain exact measurements, it is therefore necessary, if appropriate, to identify the errors generated by these perturbations and to correct them. Various methods are known for making such a correction.

According to a first known method, which requires the magnetometer to be installed with precision on the vehicle in order to used, a magnetic perturbation model of the form $Hm=[B].H+H_B$ is defined, in which:

Hm represents the perturbed field measured by the magnetometer;

H represents the effective value of the magnetic field;

[B] is a symmetric matrix taking into account the perturbations generated by the "soft irons", the absence of an antisymmetric part being due to the precise and suitable installation of the magnetometer on the vehicle; and $H_B$ represents a perturbing field due to the perturbations generated by the "hard irons".

It will be noted that, in the absence of magnetic perturbations, the matrix [B] then representing the identity matrix and the perturbating field $H_B$ being zero, the modules of the measured magnetic field is constant and the end describes a sphere. Under the effect of perturbations, this sphere is transformed into an off-center ellipsoid.

Said first known correction method specifies that the following operations are carried out:

taking a large number of measurements of the magnetic field during variations in the heading and the attitude of the vehicle;

determining the ellipsoid best corresponding to the measurements taken; and calculating, from the ellipsoid thus determined, the components of the matrix [B] and of the perturbating field $H_P$.

The model then obtained makes it possible to calculate the effective field H from subsequent measurements taken by the magnetometer and subjected to magnetic perturbations.

However, as indicated above, this method requires a particular and very precise arrangement of the magnetometer on the vehicle, which requires specific and expensive manufacture and/or adjustment. In addition, the precision obtained by this method is unsatisfactory. These drawbacks are partially solved by a second known method, which is subject to much less stringent constraints than the previous method with regard to the arrangement of the magnetometer on the vehicle, this second known method being implemented in two successive steps:

in a first step, a method similar to that of the previous method is used to determine a measurement conserving constancy of the norm of the field, said measurement being then affected only by a misalignment; and in a second step, the asymmetric component of the transformation matrix similar to the previous matrix [B] is determined from the variations in the vertical component of the magnetic field, this step being implemented by using attitude measurements.

This second known method has numerous drawbacks. In particular, implementing the two aforementioned steps presupposes a complex and lengthy maneuvering procedure of the vehicle, during which the measurements used are taken.

SUMMARY OF THE INVENTION

The object of the present invention is to overcome these drawbacks. It relates to a method which makes it possible to correct, simply, quickly and accurately, errors in the measurements of a magnetometer mounted on board a vehicle, in particular an aircraft, which errors are due to magnetic perturbations, as well as to a misalignment of the magnetometer relative to a vehicle reference frame connected with said vehicle.

To this end, according to the invention, said method is noteworthy in that:

a theoretical model correcting the errors of the magnetometer is defined in the form:

$$Hc=[A].Hm+a.Hm'+Hp,$$

in which

Hc is the corrected field,

[A] is a matrix to be determined, a is a coefficient or a matrix to be determined, Hp is a perturbing field to be determined, Hm is the value measured by the magnetometer in the vehicle reference frame of the magnetic field, and Hm' is the time derivative of said measured magnetic field Hm which varies as a function of the angular position of said vehicle;

the corrected field Hc is assumed to be the terrestrial field defined in the vehicle reference frame, so that:

$$[A].Hm+a.Hm'+Hp=[M].H$$

with:

H the effective value of the magnetic field in a base reference frame, and

[M] a change of frame matrix from said base reference frame to said vehicle reference frame;

at least one measurement Hm of the magnetic field is taken using the magnetometer;

the derivative Hm' of said measured magnetic field Hm is calculated;

the coefficients of the change of frame matrix [M] are determined;

an error vector E with components Ex, Ey and Ez is defined, defined by the equation $$E=[M].H-([A].Hm+a.Hm'+Hp);$$

a composite error $E^2=Ex^2+Ey^2+Ez^2$ is defined;

a system of equations formed by n equations of the type $(\partial \Sigma E^2)/\partial ci=0$, i=1 to n, $(\partial \Sigma E^2)/\partial ci$ corresponding to the partial derivative of the sum of the composite errors, for all the measurements, $\Sigma E^2$ with respect to a coefficient ci, the various coefficients ci representing the coefficients to be determined in said theoretical model, namely the coefficients of [A], of a and of Hp, as well as at least one component of the effective magnetic field H;

said system of equations is solved so as to obtain said coefficients ci, including said component of the effective magnetic field H; and the corrective model obtained from said coefficients is used to correct the errors due to magnetic perturbations and misalignments in the measurements of said magnetometer.

Thus, by virtue of the invention, the corrective model is determined in a single step, which makes it simple to implement, in particular as regards the vehicle maneuvering procedure during which the measurements are taken.

In addition, the method according to the invention makes it possible to determine, simultaneously with the calculation of said corrective model, at least one component of the effective magnetic field in the base reference frame.

The invention further has numerous other advantages. In particular, it leads to:

higher precision in the measurements, confirmed by aircraft flight trials; and completely free installation of the magnetometers on the vehicle, making it possible to simplify the fastening device, which saves weight and reduces the manufacturing cost.

In addition, the present invention is not limited as regards the elements of the theoretical model and, in particular, the amplitude of the terms of the matrix [A], which makes it possible to alleviate the constraints of producing the magnetometer.

In embodiments for which only the vertical component of the magnetic field is determined, $E^2=Ez^2$ is advantageously used as composite error, so that only the coefficients of the third row of the matrix $[M]^{-1}$ are used, said matrix $[M]^{-1}$ being the change of frame matrix from said vehicle reference frame to said base reference frame, said coefficients being determined from the longitudinal and transverse attitudes of said vehicle.

Moreover, in the embodiments for which all three components of the magnetic field are determined, the coefficients of the matrix [M] are advantageously determined from longitudinal and transverse attitudes, as well as from the heading of said vehicle.

It will be noted that this embodiment makes it possible to increase the precision compared to the aforementioned known correction methods, since said known methods use secondary properties of the magnetic field to be measured, namely the constancy of the modulus and the constancy of the vertical component of this field, as indicated above, whereas the present invention directly uses a heading value by taking into account the constancy of the three components of the magnetic field in the base reference frame.

According to the invention, said theoretical model may have various forms for implementing the method.

According to a first particularly advantageous embodiment, said theoretical model is a dynamic linear model, in which a represents a matrix [T] taking into account the eddy currents existing on the vehicle and the delay between, on the one hand, the measurement of the magnetic field and, on the other hand, the measurements of the attitudes and of the heading of the vehicle.

This first embodiment, which makes it possible to identify a magnetic perturbation component having matrix proportionality with the derivative of the measured magnetic field, is particular well suited for a vehicle such as a large aircraft bearing a metal structure, in which eddy currents which perturb the magnetometer measurements are generated during turning phases.

According to a second embodiment, said theoretical model is a simplified dynamic linear model, in which a represents a coefficient τ taking into account the delay between, on the one hand, the measurement of the magnetic field and, on the other hand, the measurements of the attitudes and of the heading of the vehicle.

These two first embodiments also make it possible to compensate to some degree for the limiting of the passband of the magnetometer.

It will also be noted that the two models above both particularly advantageously use the derivative of the measured magnetic field for a trial installation which records the measurements taken during maneuvers of the vehicle, said measurements being analyzed subsequently, since these models make it possible to take into account the asymmetries of the delays in the acquisition, on the one hand, of the magnetic field measurements and, on the other hand, of the attitude and heading measurements, which are often difficult to control in a trial installation.

Preferably, the derivative Hm' of the measured magnetic field Hm is calculated by the equation $\vec{Hm'}=\vec{Hm}\wedge\vec{\omega}$, in which $\vec{\omega}$ represents the instantaneous rotation vector of the vehicle.

In order to simplify implementation of the invention, it is advantageously possible to use as theoretical model a steady-state linear model defined by the equation [A].Hm+ Hp=[M].H.

In addition, advantageously, the heading value used may represent a geographic heading value or a heading value subject to an arbitrary constant error, such as that delivered by a free gyroscopic mode attitude and heading unit, which allows varied implementation of the invention.

The present invention also relates to a device for implementing the aforementioned method.

According to the invention, said device is noteworthy in that it includes:

a first calculation module, receiving the magnetic field Hm measured by the magnetometer and capable of determining the time derivative Hm' of said measured magnetic field Hm which varies as a function of the angular position of the vehicle;

a second calculation module capable of calculating the coefficients of the change of frame matrix [M], which are used for implementing the invention, from the attitudes and, if necessary, the heading of the vehicle; and a main calculation module, connected to said first and second calculation modules and capable of determining said corrective model and said effective magnetic field.

It will be noted that the present invention also relates to two systems including the device according to the invention, namely, on the one hand, an aircraft on-board heading and attitude reference system including a magnetometer used to correct a possible drift in the heading measurement and, on the other hand, an aircraft inertial unit which is associated with a magnetometer.

In the attitude and heading reference system, the device according to the invention is used to correct the measurement errors of said magnetometer, whereas, in the inertial unit, said device is used to determine the terrestrial magnetic field in precise fashion, in collaboration with said magnetometer as well as to correct the measurement errors of said magnetometer.

BRIEF DESCRIPTION OF THE DRAWINGS

The figures of the appended drawing will clearly explain how the invention may be implemented. On these figures, identical references denote similar elements.

DESCRIPTION OF THE PREFERRED EMBODIMENTS

Figure 1:
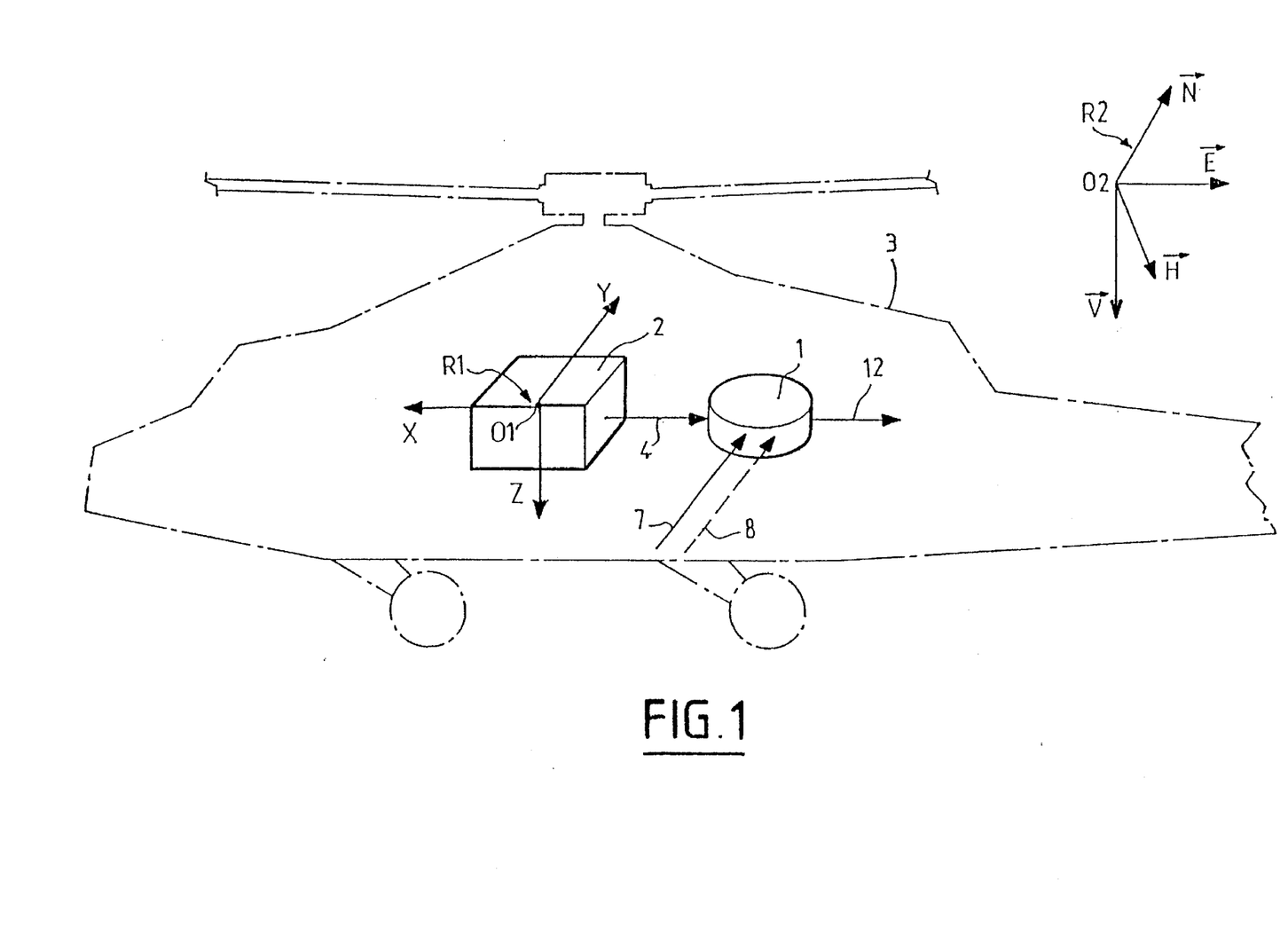
FIG. 1 schematically shows a vehicle including a device according to the invention.

The device 1 according to the invention is intended to correct errors due to magnetic perturbations and to misalignments in the measurements of the magnetometer 2 mounted on board a vehicle 3, said vehicle 3 being represented schematically in the form of a helicopter on FIG. 1.

The magnetometer 2 can measure, in a vehicle reference frame R1 which is associated with the vehicle, the components of a directional physical magnetic quantity with locally constant amplitude, represented by a vector, such as the vector $\vec{H}$ aligned, in the example represented, with the gradient of the terrestrial magnetic potential. The magnetic field Hm measured by said magnetometer 2 satisfies the equation Hm=[M].H, in which H represents the effective value of the magnetic field in a base reference frame R2 and [M] represents the change of frame matrix from said base reference frame R2 to said vehicle reference frame R1.

Figure 2:
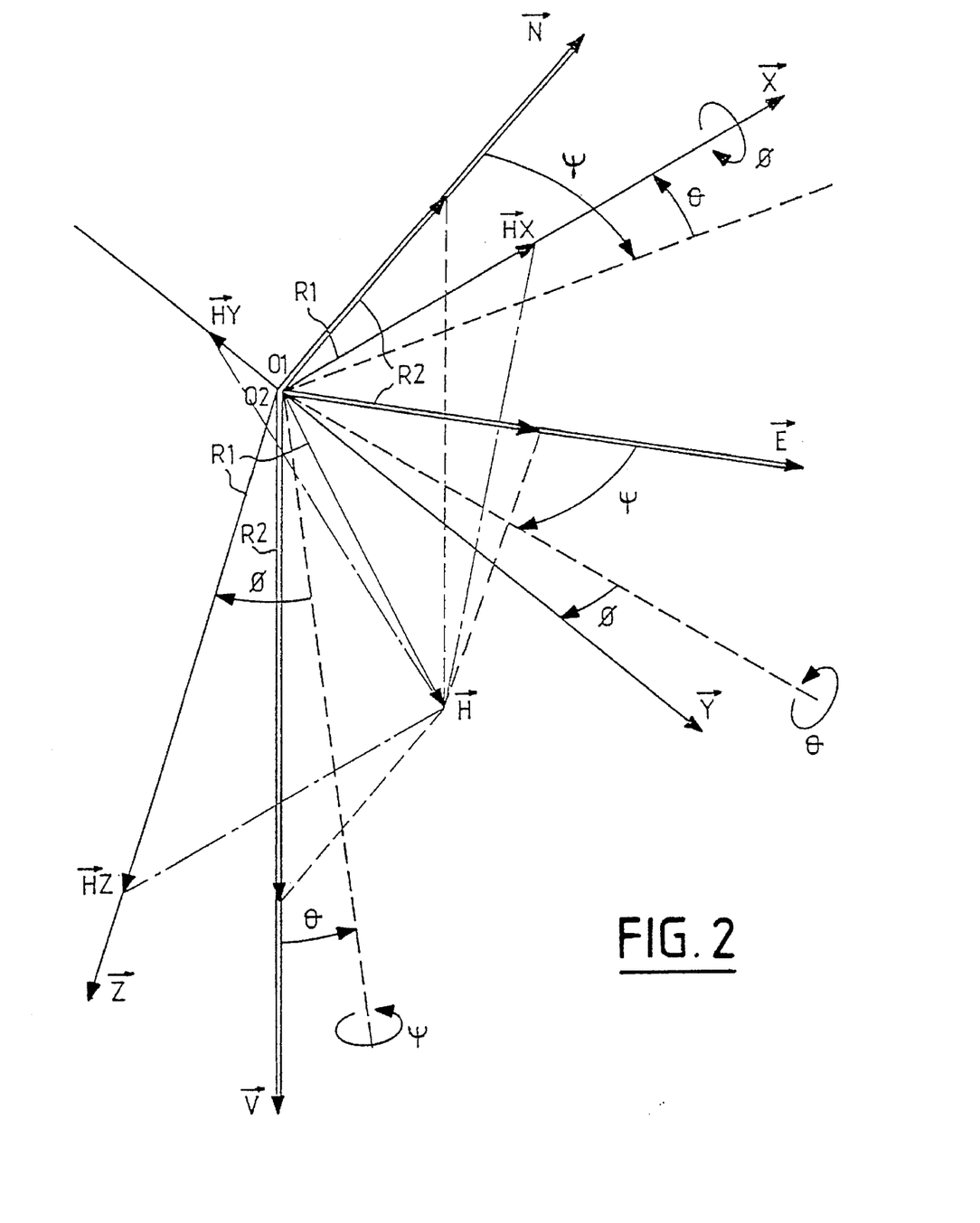
FIG. 2 illustrates the reference systems making it possible to explain implementation of the present invention.

Said base reference frame R2 may, for example, be formed by three axes $\vec{V}$, $\vec{N}$ and $\vec{E}$ defined as follows:

$\vec{V}$ is an axis parallel to the gradient of the terrestrial gravitational field, pointing toward the center of the earth, and giving the local vertical;

$\vec{N}$ is a horizontal axis giving the geographic or directional north; and $\vec{E}$ is an axis giving east, as represented in FIGS. 1 and 2.

As is known, change from one of these reference frames R1 and R2 to the other requires three successive rotations defined by the Euler angles $\Psi$, $\theta$ and $\psi$ represented on FIG. 2, in which:

$\Psi$ is the heading angle, $\theta$ is the longitudinal attitude angle, and $\psi$ is the transverse attitude angle.

These three rotations are written in the form of the conventional Euler angle matrix, that is to say the change of frame matrix $[M]^{-1}$ permitting change from the reference frame R1 (O1XYZ) to the reference frame R2, defined as follows:

$$[M]^{-1} = \begin{vmatrix} \cos\psi \cdot \cos\Theta & \cos\psi \cdot \sin\Theta \cdot \sin\Phi - \sin\psi \cdot \cos\Phi & \sin\psi \cdot \sin\Phi + \cos\psi \cdot \sin\Theta \cdot \cos\Phi \\ \sin\psi \cdot \cos\Theta & \cos\psi \cdot \cos\Phi + \sin\psi \cdot \sin\Theta \cdot \sin\Phi & \sin\psi \cdot \sin\Theta \cdot \cos\Phi - \cos\psi \cdot \sin\Phi \\ -\sin\Theta & \cos\Theta \cdot \sin\Phi & \cos\Theta \cdot \cos\Phi \end{vmatrix}$$

However, such a magnetometer 2 is generally subject to magnetic perturbations and is not generally perfectly aligned with the axes of the vehicle, which introduces errors into the measurements, so that the measured magnetic field Hm does not satisfy the aforementioned equation and does not have the components HX, HY and HZ represented in FIG. 2.

As is known, there are essentially four types of perturbations which introduce errors into the measurements of the magnetometer 2:

three types of magnetic perturbation, namely, more specifically:

so-called "soft iron" perturbations due to the presence in proximity to the magnetometer 2 of unmagnetized ferromagnetic materials which deflect the field lines;

so-called "hard iron" perturbations, due to the presence in proximity to the magnetometer 2 of magnetized and/or electrically conductive materials through which direct currents flow; and magnetic fields which are generated by the eddy currents created by magnetic flux variations in the metal structures of the vehicle; and installation errors. It is known that the ideal positioning of the magnetometer corresponds to perfect alignment of the reference coordinate system of the magnetometer relative to that of the vehicle. However, because of manufacturing tolerances, this perfect alignment is never achieved, which causes perturbation of the vector measurements taken.

The device 1 according to the invention is intended to identify the errors generated by these magnetic and mechanical perturbations, and to correct them.

A description is given below of a first embodiment of the invention, making it possible to determine simultaneously:

a corrective model making it possible to correct the errors due to magnetic and mechanical perturbations in the measurements of the magnetometer 2; and all three components of the magnetic field H in the base reference frame.

To this end, a theoretical model correcting the errors of the magnetometer is first of all defined in the form:

$$Hc=[A].Hm+[T].Hm'+Hp \tag{1}$$

in which, in addition to the aforementioned element Hm:

Hc is the corrected field;

[A] is a matrix to be determined, taking into account the so-called "soft iron" perturbations and the misalignments, without angular value limitations;

[T] is a matrix to be determined, taking into account the eddy currents, the delay differences between the measurements of the magnetic field, on the one hand, and the attitude and heading measurements, on the other hand, as well as, to a certain extent, the limiting of the passband of the magnetometer 2;

Hp is a perturbating field to be determined; and

Hm' is the time derivative of said measured magnetic field Hm which varies as a function of the angular position of the vehicle 3.

The corrected field Hc is assumed to be the terrestrial field projected into the vehicle reference frame, so that:

$$[A].Hm+[T].Hm'+Hp=[M].H$$

Next, during maneuvers of said vehicle 3, measurements of the magnetic field are taken using the magnetometer 2, and heading and attitude measurements are taken using a suitable system such as, for example, a free gyroscopic mode attitude and heading unit (not shown) mounted on said vehicle 3.

These maneuvers may correspond, for example for an aircraft, to two turns, to the right then to the left, of 360° with a roll of the order of 30°.

The attitude and optionally heading measurements are used to calculate the change of frame matrix [M] as defined above.

Said theoretical model (1) can be written in the form of the following system:

$$A_{11}Hmx + A_{12}Hmy + A_{13}Hmz + T_{11}Hmx' + T_{12}Hmy' + T_{13}Hmz' + Hpx =$$
$$R_{11}Hn + R_{12}He + R_{13}Hv$$

$$A_{21}Hmx + A_{22}Hmy + A_{23}Hmz + T_{21}Hmx' + T_{22}Hmy' + T_{23}Hmz' + Hpy =$$
$$R_{21}Hn + R_{22}He + R_{23}Hv$$

$$A_{31}Hmx + A_{32}Hmy + A_{33}Hmz + T_{31}Hmx' + T_{32}Hmy' + T_{33}Hmz' + Hpz =$$
$$R_{31}Hn + R_{32}He + R_{33}Hv$$

in which:

the terms $A_{ij}$, $T_{ij}$ and $R_{ij}$ (i=1, 2, 3 and j=1, 2, 3) are respectively the coefficients of the matrices [A], [T] and [M];

Hmx, Hmy and Hmz are the components of the vector Hm;

Hmx', Hmy' and Hmz' are the components of the vector Hm';

Hpx, Hpy and Hpz are the components of the vector Hp; and

Hn, He and Hv are the components of the vector H.

It will be noted that this system can only be determined to within a multiplicative constant. In order to raise the indeterminacy, it is possible to divide the various equations by a coefficient appearing in each of them, for example Hn, He or Hv. However, the coefficients He and Hv may have very low values in certain regions of the terrestrial globe, which risks posing calculation problems, said equations are preferably divided by Hn, so as to obtain the following system:

$$a_{11}Hmx + a_{12}Hmy + a_{13}Hmz + t_{11}Hmx' + t_{12}Hmy' + t_{13}Hmz' + hpx =$$
$$R_{11} + R_{12}he + R_{13}hv$$

$$a_{21}Hmx + a_{22}Hmy + a_{23}Hmz + t_{21}Hmx' + t_{22}Hmy' + t_{23}Hmz' + hpy =$$
$$R_{21} + R_{22}he + R_{23}hv$$

$$a_{31}Hmx + a_{32}Hmy + a_{33}Hmz + t_{31}Hmx' + t_{32}Hmy' + t_{33}Hmz' + hpz =$$
$$R_{31} + R_{32}he + R_{33}hv$$

with:

$a_{ij}=A_{ij}/Hn$ $t_{ij}=T_{ij}/Hn$ hpx=Hpx/Hn hpy=Hpy/Hn hpz=Hpz/Hn he=He/Hn hv=Hv/Hn The error vector E with components Ex, Ey and Ez, defined by the equation:

$$E=[M].H-([A].Hm+[T].Hm'+Hp)$$

is then considered.

However, in order to make it possible to use the above system, a modified error vector $\epsilon$ with components $\epsilon x$, $\epsilon y$ and $\epsilon z$ satisfying the equation $\epsilon=E/Hn$ is determined.

Said components $\epsilon x$, $\epsilon y$ and $\epsilon z$ are therefore defined by the following equations:

$$\epsilon_x = a_{11}Hmx + a_{12}Hmy + a_{13}Hmz + t_{11}Hmx' + t_{12}Hmy' +$$
$$t_{13}Hmz' + hpx - (R_{11} + R_{12}he + R_{13}hv)$$

$$\epsilon_y = a_{21}Hmx + a_{22}Hmy + a_{23}Hmz + t_{21}Hmx' + t_{22}Hmy' +$$
$$t_{23}Hmz' + hpy - (R_{21} + R_{22}he + R_{23}hv)$$

$$\epsilon_z = a_{31}Hmx + a_{32}Hmy + a_{33}Hmz + t_{31}Hmx' + t_{32}Hmy' +$$
$$t_{33}Hmz' + hpz - (R_{31} + R_{32}he + R_{33}hv)$$

A composite error of the form $E^2=Ex^2+Ey^2+Ez^2$ or of the form $\epsilon^2=\epsilon x^2+\epsilon y^2+\epsilon z^2$ is determined from said components.

Next, a system of equations formed by n equations of the type $(\partial \Sigma E^2)/\partial ci=0$, i=1 to n, or of the type $(\partial \Sigma E^2/\partial ci=0$, $(\partial \Sigma E^2)/\partial ci$ corresponding to the partial derivative of the sum $\Sigma E^2$ of the composite errors, for all the measurements, with respect to a coefficient ci, the various coefficients ci representing the coefficients to be determined in said theoretical model, namely the coefficients of [A], of a and of Hp, as well as the components of the effective magnetic field H; and said system of equations with dimension 23×23 is solved by a numerical method.

In order to recover coefficients with exact dimensions, all the coefficients obtained are divided by a suitable divisor. This suitable divisor may, for example, be one of the coefficients $a_{11}$, $a_{22}$ or $a_{33}$ or the determinant of the matrix $[a_{ij}]$.

The coefficients obtained constitute the corrective model (1) making it possible to determine the exact values of the magnetic field from field values measured by the magnetometer 2, in the presence of magnetic perturbations and an arbitrary alignment of the magnetometer.

Instead of the dynamic linear model (1) defined above, it is also possible according to the invention to use:

either a simplified dynamic linear; model of the form:

$$[A].Hm+\tau T.Hm'+Hp \qquad (2)$$

$\tau$ being a coefficient representing the delay between the measurements of the magnetic field, on the one hand, and the heading and attitude measurements, on the other hand;

or a steady-state linear model of the form:

$$[A].Hm+Hp \qquad (3).$$

The various coefficients of said models (2) and (3) are determined in the same way as the coefficients of the model (1), that is to say as described above.

The embodiment of the method according to the invention described above therefore makes it possible simultaneously to determine said corrective model and all three components of the terrestrial magnetic field.

A simplified embodiment that does not use a heading reference, and only makes it possible to determine, in addition to said corrective model, the vertical component Hv of said terrestrial magnetic field, is described below.

To this end, one of the three theoretical models (1), (2), (3) defined above is used. Implementation only on the basis of the dynamic linear model (1) is described below, the simplified dynamic model (2) and steady-state model (3) being treated identically.

The theoretical model (1) defined in the form:

$$[M]^{-1}.([A].Hm+[T].Hm'+Hp)=H$$

is written in detail:

$$[M]^{-1}\begin{vmatrix} A_{11}Hmx + A_{12}Hmy + A_{13}Hmz + T_{11}Hmx' + T_{12}Hmy' + T_{13}Hmz' + Hpx \\ A_{21}Hmx + A_{22}Hmy + A_{23}Hmz + T_{21}Hmx' + T_{22}Hmy' + T_{23}Hmz' + Hpy \\ A_{31}Hmx + A_{32}Hmy + A_{33}Hmz + T_{31}Hmx' + T_{32}Hmy' + T_{33}Hmz' + Hpz \end{vmatrix} = \begin{vmatrix} Hn \\ He \\ Hv \end{vmatrix}$$

In the present assumed case, the components Hn and He of the effective magnetic field H are inaccessible because of the absence of a heading reference. Consequently, only the third equation of the above system can be analyzed for the purpose of identifying a component of the magnetic field, said third equation being written:

$$R_{31}^* (A_{11}Hmx + A_{12}Hmy + A_{13}Hmz +$$

$$T_{11}Hmx' + T_{12}Hmy' + T_{13}Hmz' + Hpx) +$$

$$R_{32}^* (A_{21}Hmx + A_{22}Hmy + A_{23}Hmz +$$

$$T_{21}Hmx' + T_{22}Hmy' + T_{23}Hmz' + Hpy) +$$

$$R_{33}^* (A_{31}Hmx + A_{32}Hmy + A_{33}Hmz + T_{31}Hmx' +$$

$$T_{32}Hmy' + T_{33}Hmz' + Hpz) = Hv.$$

$R_{31}^*$, $R_{32}^*$ and $R_{33}^*$ are the three components of the third row of the change of frame matrix $[M]^{-1}$ defined above, i.e.:
$R_{31}^* = -\sin\theta$
$R_{32}^* = \cos\theta.\sin\psi$
$R_{33}^* = \cos\theta.\cos\psi$ These coefficients $R_{31}^*$, $R_{32}^*$ and $R_{33}^*$ are therefore defined only from the attitude angles $\theta$ and $\psi$, and not from the heading angle $\Psi$.

As in the previous embodiment, this equation has an infinite number of solutions differing by a multiplicative constant. In order to raise the indeterminacy which exists, both terms of the equation are divided by Hv so as to obtain the equation:

$$R_{31}^*(a_{11}Hmx + a_{12}Hmy + a_{13}Hmz +$$

$$t_{11}Hmx' + t_{12}Hmy' + t_{13}Hmz' + hpx) +$$

$$R_{32}^*(a_{21}Hmx + a_{22}Hmy + a_{23}Hmz +$$

$$t_{21}Hmx' + t_{22}Hmy' + t_{23}Hmz' + hpy) +$$

$$R_{33}^*(a_{31}Hmx + a_{32}Hmy + a_{33}Hmz + t_{31}Hmx' +$$

$$t_{32}Hmy' + t_{33}Hmz' + hpz) = 1.$$

with
$a_{ij}=A_{ij}/Hv$
$t_{ij}=T_{ij}/Hv$
hpx=Hpx/Hv
hpy=Hpy/Hv
hpz=Hpz/Hv

In this case, only the component $\epsilon z$ of the error vector $\epsilon$ is determined. This component $\epsilon z$ is defined by the equation:

$$\epsilon z = R_{31}^*(a_{11}Hmx + a_{12}Hmy + a_{13}Hmz +$$

$$t_{11}Hmx' + t_{12}Hmy' + t_{13}Hmz' + hpx) +$$

$$R_{32}^*(a_{21}Hmx + a_{22}Hmy + a_{23}Hmz +$$

$$t_{21}Hmx' + t_{22}Hmy' + t_{23}Hmz' + hpy) +$$

$$R_{33}^*(a_{31}Hmx + a_{32}Hmy + a_{33}Hmz + t_{31}Hmx' +$$

$$t_{32}Hmy' + t_{33}Hmz' + hpz) - 1.$$

A system of equations formed by equations of the type $(\partial\Sigma\epsilon z^2)/\partial ci=0$ is then defined, the coefficients ci again representing the coefficients to be determined of the theoretical model (1), and this system is solved in the usual way.

The coefficients obtained are divided by $a_{11}$ to obtain the correct dimensions and the desired corrective model (1).

Implementation is therefore identical to that presented above.

Figure 3:
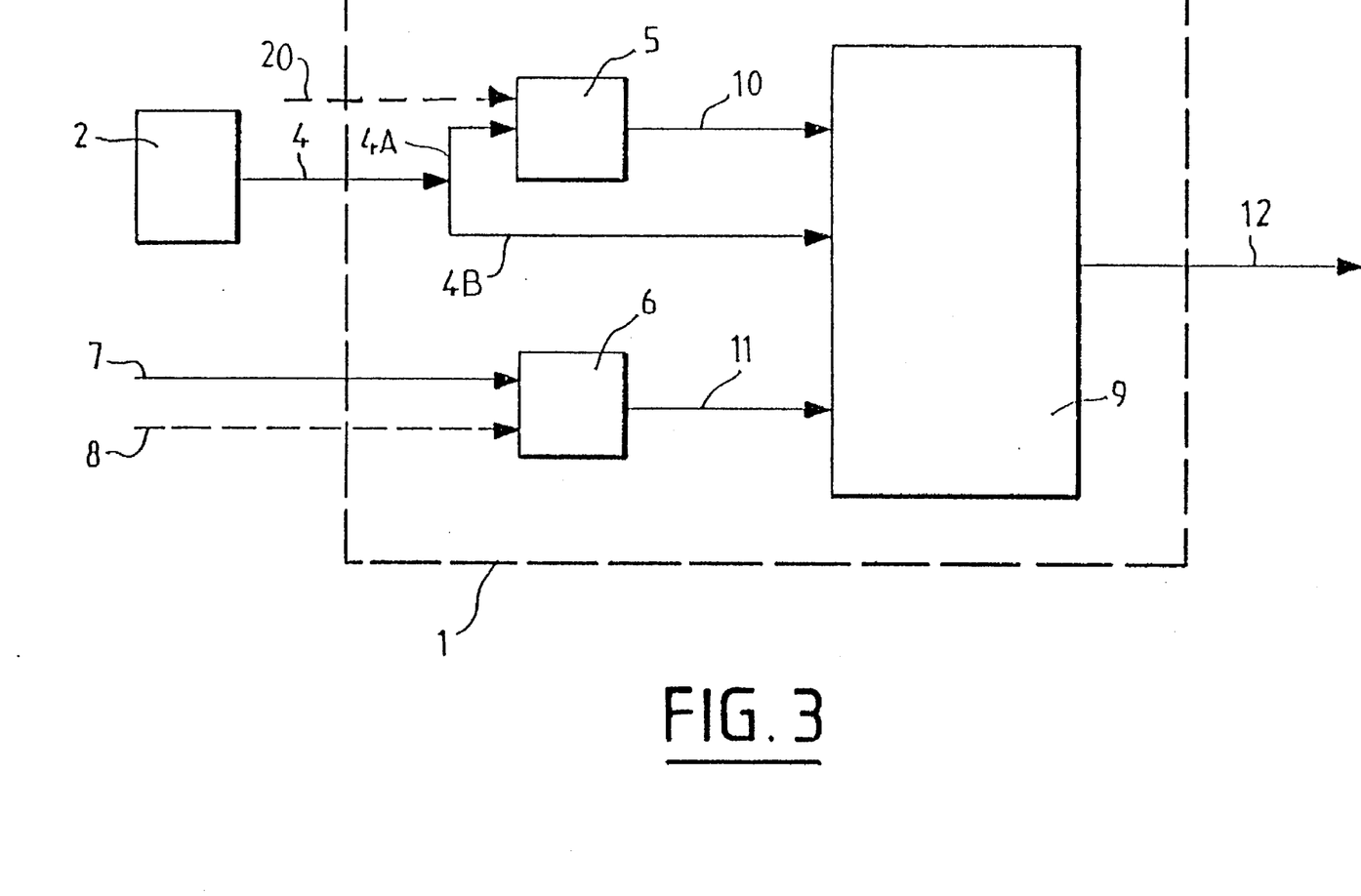
FIG. 3 is the block diagram of the device according to the invention.

For these embodiments of the method according to the invention, the device 1, which is connected by a link 4 to the magnetometer 2, includes, according to the invention and as represented on FIG. 3:

a calculation module 5 receiving, via one branch 4A of said link 4 which is split into two branches 4A and 4B, the value Hm of the magnetic fields measured by the magnetometer 2, said calculation module 5 being capable of determining the time derivative Hm' of said measured magnetic field Hm;

a calculation module 6 receiving, from a suitable device (not shown), on the one hand, the values of the attitudes of the vehicle 3 via a link 7 and, on the other hand, optionally, that is to say if it is required for implementing the invention, the value of the heading of the vehicle 3 via a link 8, said calculation module 6 being capable of calculating the coefficients of the change of frame matrix [M] which are used during implementation of the invention; and a main calculation module 9 connected to said calculation modules 5 and 6 and to said magnetometer 2, respectively via links 10 and 11 and the branch 4B of the link 4, said main calculation module 9 being capable of determining said corrective module and said effective magnetic field and being capable of transmitting the results obtained via a link 12, for example to a user device (not shown).

Of course, said main calculation module 9 and said calculation modules 5 and 6 can optionally be installed in different computers.

According to a particularly advantageous embodiment, the calculation module 5 calculates the derivative $\vec{Hm}'$ from the vector product of the measured magnetic field $\vec{Hm}$ with the instantaneous rotation vector $\vec{\omega}$ of the vehicle 3 in the vehicle reference frame R1, i.e. $\vec{Hm}'=\vec{Hm}\wedge\vec{\omega}$. The vector $\vec{\omega}$ can for this purpose be transmitted to the calculation module 5 via a link 20. This method has the advantage of providing a derivative which is not limited at high frequencies, in contrast to other known methods.

The present invention as described above has numerous advantages, in particular:

an increase in the precision of the results obtained in comparison with the known methods;

completely free geometrical installation of the magnetometer 2 on the vehicle 3;

ease of implementation of the method according to the invention, in a single phase of operations;

an implementation device 1 which is simple and inexpensive; and a lower requirement regarding the precision of the magnetometer.

In addition, the device 1 according to the invention can advantageously be used for various types of systems (not shown) on board said vehicle 3.

For example, an aircraft attitude and heading reference system including, among other things, a magnetometer for correcting a possible drift in the heading, can use the device 1 to correct the errors due to the perturbations in the measurements of said magnetometer.

In addition, an aircraft inertial unit, associated with a magnetometer, can use the device 1 according to the invention in order to determine, in precise fashion, in collaboration with said magnetometer, the declination and inclination of the terrestrial magnetic field, as well as to correct the measurement errors of said magnetometer.

These various examples make it possible to demonstrate clearly the manifold uses and the advantages of the present invention.

We claim:

1. A method for correcting errors in the measurements of a magnetometer (2) mounted on board a vehicle (3), due to magnetic perturbations as well as to a misalignment of the magnetometer (2) relative to a vehicle reference frame (R1) connected with said vehicle (3), wherein:

a theoretical model correcting the errors of the magnetometer is defined in the form:

$$Hc=[A].Hm+a.Hm'+Hp$$

in which

Hc is the corrected field,

[A] is a matrix to be determined, a is a coefficient or a matrix to be determined, Hp is a perturbing field to be determined, Hm is the value measured by the magnetometer (2) in the vehicle reference frame (R1) of the magnetic field, and Hm' is the time derivative of said measured magnetic field Hm which varies as a function of the angular position of the vehicle;

the corrected field Hc is assumed to be the terrestrial field defined in the vehicle reference frame, so that:

$$[A].Hm+a.Hm'+Hp=[M].H$$

with:

H the effective value of the magnetic field in a base reference frame (R2), and

[M] a change of frame matrix from said base reference frame (R2) to said vehicle reference frame (R1);

at least one measurement Hm of the magnetic field is taken using the magnetometer (2);

the derivative Hm' of said measured magnetic field Hm is calculated;

the coefficients of the change of frame matrix [M] are determined;

an error vector E with components Ex, Ey and Ez is defined, defined by the equation $$E=[M].H-([A].Hm+a.Hm'+Hp);$$

a composite error $E^2=Ex^2+Ey^2+Ez^2$ is defined;

a system of equations formed by n equations of the type $(\partial \Sigma E^2)/\partial ci=0$, i=1 to n, $(\partial \Sigma E^2)/\partial ci$ corresponding to the partial derivative of the sum $\Sigma E^2$ of the composite errors, for all the measurements, with respect to a coefficient ci, the various coefficients ci representing the coefficients to be determined in said theoretical model, namely the coefficients of [A], of a and of Hp, as well as at least one component of the effective magnetic field H;

said system of equations is solved so as to obtain said coefficients ci, including said component of the effective magnetic field H; and the corrective model obtained from said coefficients is used to correct the errors due to magnetic perturbations and misalignments in the measurements of said magnetometer (2).

2. Method as claimed in claim 1, for determining only the vertical component of the magnetic field, wherein $E^2=Ez^2$ is used as composite error, so that only the coefficients of the third row of the matrix $[M]^{-1}$ are used, said matrix $[M]^{-1}$ being the change of frame matrix from said vehicle reference frame (R1) to said base reference frame (R2), said coefficients being determined from the attitudes of said vehicle (3).

3. The method as claimed in claim 1, for determining all three components of the magnetic field, wherein the coefficients of the matrix [M] are determined from the attitudes as well as from the heading of said vehicle (3).

4. The method as claimed in claim 3, wherein said heading is a geographic heading.

5. The method as claimed in claim 3, wherein said heading is a heading delivered by a free gyroscopic mode attitude and heading unit.

6. The method as claimed in claim 1, wherein said theoretical model is a dynamic linear model, in which a represents a matrix [T] taking into account the eddy currents existing on the vehicle (3) and the delay between, on the one hand, the measurement of the magnetic field and, on the other hand, the measurements of the attitudes and of the heading of the vehicle, as well as at least partially the limiting of the passband of the magnetometer.

7. The method as claimed in claim 1, wherein said theoretical model is a simplified dynamic linear model, in which a represents a coefficient $\tau$ taking into account the delay between, on the one hand, the measurement of the magnetic field and, on the other hand, the measurements of the attitudes and of the heading of the vehicle, as well as at least partially the limiting of the passband of the magnetometer.

8. The method as claimed in claim 1, wherein said theoretical model is a steady-state linear model defined by the equation [A].Hm+Hp=[M].H.

9. The method as claimed in claim 1, wherein the derivative Hm' of the measured magnetic field Hm is calculated by the equation $\vec{Hm'}=\vec{Hm}\wedge\vec{\omega}$, in which $\vec{\omega}$ represents the instantaneous rotation vector of the vehicle (3).

10. A device for implementing the method as specified under claim 1, which includes:

a first calculation module (5), receiving the magnetic field Hm measured by the magnetometer (2) and capable of determining the time derivative Hm' of said measured magnetic field Hm which varies as a function of the angular position of the vehicle (3);

a second calculation module (6) capable of calculating the coefficients of the change of frame matrix [M], which are used for implementing the invention, from the attitudes and, if necessary, the heading of the vehicle (3); and a main calculation module (9), connected to said first and second calculation modules (5, 6) and capable of determining said corrective model and at least one component of the effective magnetic field.

11. The device as claimed in claim 10, wherein said main calculation module (9) and said first and second calculation modules (5, 6) are installed in different computers.

12. An aircraft on-board attitude and heading reference system including a magnetometer for correcting a possible drift in the heading measurement, which includes the device (1) specified under claim 10, said device (1) being used to correct the measurement errors of said magnetometer.

13. An aircraft inertial unit associated with a magnetometer, which includes the device (1) specified under claim 10, said device (1) being used to determine the terrestrial magnetic field, in precise fashion, in collaboration with said magnetometer as well as to correct the measurement errors of said magnetometer.

* * * * *